US009912701B2

United States Patent
Nagaratnam et al.

(10) Patent No.: US 9,912,701 B2
(45) Date of Patent: *Mar. 6, 2018

(54) ADMINISTRATION OF A CONTEXT-BASED CLOUD SECURITY ASSURANCE SYSTEM

(71) Applicant: International Business Machines Corporation, Armonk, NY (US)

(72) Inventors: Nataraj Nagaratnam, Cary, NC (US); Jeffrey Robert Hoy, Southern Pines, NC (US); Sreekanth Ramakrishna Iyer, Bangalore (IN); Sridhar R. Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/080,707

(22) Filed: Mar. 25, 2016

(65) Prior Publication Data
US 2016/0212175 A1    Jul. 21, 2016

Related U.S. Application Data

(63) Continuation of application No. 14/555,748, filed on Nov. 28, 2014.

(51) Int. Cl.
H04L 29/06     (2006.01)
G06Q 10/06    (2012.01)
(Continued)

(52) U.S. Cl.
CPC ............... *H04L 63/20* (2013.01); *G06F 7/76* (2013.01); *G06Q 10/0635* (2013.01);
(Continued)

(58) Field of Classification Search
CPC ..... H04L 63/20; H04L 63/105; H04L 63/102; H04L 41/5054; H04L 47/78; H04L 67/30;
(Continued)

(56) References Cited

U.S. PATENT DOCUMENTS 8,055,904 B1   11/2011   Cato et al.
9,027,077 B1 *  5/2015   Bharali ................... H04L 63/02
                                                                      726/1
(Continued)

*Primary Examiner* — Carl Colin
*Assistant Examiner* — Gary Lavelle
(74) *Attorney, Agent, or Firm* — Jeffrey S. LaBaw; David H. Judson

(57) ABSTRACT

A cloud infrastructure is enhanced to provide a context-based security assurance service to enable secure application deployment. The service inspects network and cloud topologies to identify potential security capabilities and needs. Preferably, these options are then surfaced to the user with easy-to-understand, pre-configured templates representing security assurance levels. When a template (e.g., representing a pre-configured assurance level) is selected by the user, the system then applies specific capabilities and controls to translate the user-selected generalized specification (e.g., "high security") into granular requirements for a specific set of security resources. Preferably, the identification of these security resources is based on system configuration, administration, and information associated with the pre-configured template.

8 Claims, 7 Drawing Sheets

(51) Int. Cl.
*G06F 7/76* (2006.01)
*H04M 3/22* (2006.01)
*H04L 12/08* (2006.01)
*H04W 12/06* (2009.01)
*H04L 29/08* (2006.01)
*H04L 12/24* (2006.01)
*H04L 12/911* (2013.01)

(52) U.S. Cl.
CPC ........ *G06Q 10/06315* (2013.01); *H04L 12/08* (2013.01); *H04L 41/0893* (2013.01); *H04L 41/5054* (2013.01); *H04L 47/78* (2013.01); *H04L 63/0272* (2013.01); *H04L 63/102* (2013.01); *H04L 63/105* (2013.01); *H04L 67/30* (2013.01); *H04M 3/2263* (2013.01); *H04W 12/06* (2013.01)

(58) Field of Classification Search
CPC .......... H04L 41/0893; G06Q 10/06315; G06Q 10/0635; H04M 3/2263; H04W 12/06; H04W 12/08
See application file for complete search history.

(56) References Cited

U.S. PATENT DOCUMENTS

| | | |
|---|---|---|
| 2003/0009250 A1 | 1/2003 | Resnick et al. |
| 2005/0086502 A1 | 4/2005 | Rayes et al. |
| 2005/0096937 A1 | 5/2005 | Subash et al. |
| 2005/0132206 A1* | 6/2005 | Palliyil ................. G06F 21/566 713/188 |
| 2008/0222697 A1 | 9/2008 | Birk et al. |
| 2009/0228579 A1 | 9/2009 | Sanghvi et al. |
| 2010/0095235 A1 | 4/2010 | Bennett et al. |
| 2010/0287598 A1 | 11/2010 | Korkishko et al. |
| 2010/0318658 A1 | 12/2010 | Zorn et al. |
| 2011/0239269 A1* | 9/2011 | Wahl ................... H04L 63/0815 726/1 |
| 2011/0295986 A1 | 12/2011 | Ferris et al. |
| 2012/0036245 A1* | 2/2012 | Dare ........................ G06F 8/60 709/223 |
| 2013/0019315 A1 | 1/2013 | Chen et al. |
| 2013/0036208 A1* | 2/2013 | Dochez ................. G06F 9/5077 709/220 |
| 2013/0066940 A1 | 3/2013 | Shao et al. |
| 2013/0081099 A1* | 3/2013 | Sathish ............... G06F 21/6245 726/1 |
| 2013/0104236 A1 | 4/2013 | Ray et al. |
| 2013/0111548 A1 | 5/2013 | Kanoun et al. |
| 2013/0179495 A1* | 7/2013 | Eom .................... G06F 9/5072 709/203 |
| 2013/0311894 A1 | 11/2013 | Rexer et al. |
| 2014/0040473 A1 | 2/2014 | Ricky et al. |
| 2014/0075499 A1* | 3/2014 | Arun .................. H04L 41/5041 726/1 |

* cited by examiner

ADMINISTRATION OF A CONTEXT-BASED CLOUD SECURITY ASSURANCE SYSTEM

CROSS-REFERENCE TO RELATED APPLICATIONS

This application is related to the following applications:

"Context-based cloud security assurance system," Ser. No. 14/555,739, filed Nov. 28, 2014;

"Deployment using a context-based cloud security assurance system," Ser. No. 14/555,741, filed Nov. 28, 2014; and "Cost-based configuration using a context-based cloud security assurance system," Ser. No. 14/555,745, filed Nov. 28, 2014.

Technical Field

This disclosure relates generally to deploying applications in a "cloud" compute environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known in the art to provide appliance-based or platform-based solutions to facilitate rapid adoption and deployment of cloud-based offerings. Typically, a cloud-based offering is deployed as a cloud application package. One such appliance that may be used for this purpose is IBM® Workload Deployer, which is based on the IBM DataPower® 7199/9005 product family. Typically, the appliance is positioned directly between the business workloads that many organizations use and the underlying cloud infrastructure and platform components. Alternatively, cloud application packages may be deployed using platform-as-a-service (PAS) infrastructure, such as the IBM® SmartCloud® Orchestrator open cloud management platform. A management platform of this type typically comprises several layers including an infrastructure services layer for provisioning, configuring and managing storage, compute and network resources, a platform services layer, and an orchestration services layer to provide business process management. The platform services layer includes virtual machine image lifecycle management capabilities and pattern services, wherein a "pattern" provides deployment and management instructions for the business service. A pattern preferably is an XML-based definition of an infrastructure configuration required to provision and managed the various resources (e.g., compute, networking, storage, OS, middleware, and the like) for a specific application (or application-type) workload.

As security software deployments become increasingly complex, application developers are further removed from the inner workings of the security environment. As a consequence, security operations often are left to the security experts. The move to virtualization and private clouds, however, empowers application developers with more and more operational capability. Application developers then find themselves in a difficult position. In particular, when putting an application into production, the developer may not have the necessary background and context to evaluate properly the security impact and needs of his or her application. Today, application developers often work with security experts to design a strategy for secure application deployment. The security expert, however, may encounter the same problem, but from the other direction. As applications and middleware become increasingly complex and virtualized, the security expert may not fully understand the application to properly evaluate its security impact and needs.

Thus, there is a need to bridge this knowledge gap between application developers and security experts, and to facilitate the seamless and reliable deployment of new cloud-based applications.

BRIEF SUMMARY

According to this disclosure, a cloud infrastructure is enhanced to provide a "context-based security assurance" service to enable secure application deployment, e.g., by application developers, without requiring such individuals to possess deep security skills or detailed understanding of the underlying security mechanisms upon which their applications may execute. Generally, the assurance service operates in association with a cloud application platform that includes an application deployment mechanism. The service inspects network and cloud topologies to identify potential security capabilities and needs (e.g., virtualized DMZ, IPS, resource isolation, etc.). Preferably, these options are then surfaced to the user with easy-to-understand, pre-configured templates representing security assurance levels. When a template (e.g., representing a pre-configured assurance level) is selected by the user, the system then applies specific capabilities and controls to translate the user-selected generalized specification (e.g., "high security") into granular requirements for a specific set of security resources. Preferably, the identification of these security resources is based on system configuration, administration, and information associated with the pre-configured template. Typically, the security resources implemented (with respect to a particular solution selected by the user) increase by assurance level.

Thus, based on the selected template(s), and preferably during application deployment, a set of security configuration changes are applied to an existing application execution environment to generate a "context-based" secure cloud application "zone." Once this cloud application zone is defined, the application deployment is completed, and the zone provides an active protection for the application. This application zone active protection is security-context specific but, as noted above, the approach does not require that the individual deploying the application have detailed knowledge of the underlying security infrastructure.

Different types of users may interact with the service in different ways. In one embodiment, a first type of user (e.g., an application owner) works with the service by viewing and interacting with the template, while a second type of user (e.g., a security administrator) works with the service by viewing and interacting using one or more security administrative views, e.g., of security changes associated with the selection of templates by the first type of users. A security administrative view enables the system to receive inputs from the security administrator that may trigger enforcement of one or more security administration actions with respect to configuration of one or more security capabilities in the cloud application environment. Such inputs may include, for example, an input to approve a pending security configuration change, an input that overrides a selection of a template, or that overrides a selection of a security capability associated with a template, or that inhibits deployment of an application into the cloud application environment when a template having a minimum security assurance level associated therewith has not been selected by a first user, or the like. The security administrative view may also provide one or more additional administration functions such as: configuring a new template or modifying an existing template, using security analytics to manage application deployment based on enterprise security policy, defining security requirements for the cloud application environment, auditing security capabilities available in the cloud application environment, and the like.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
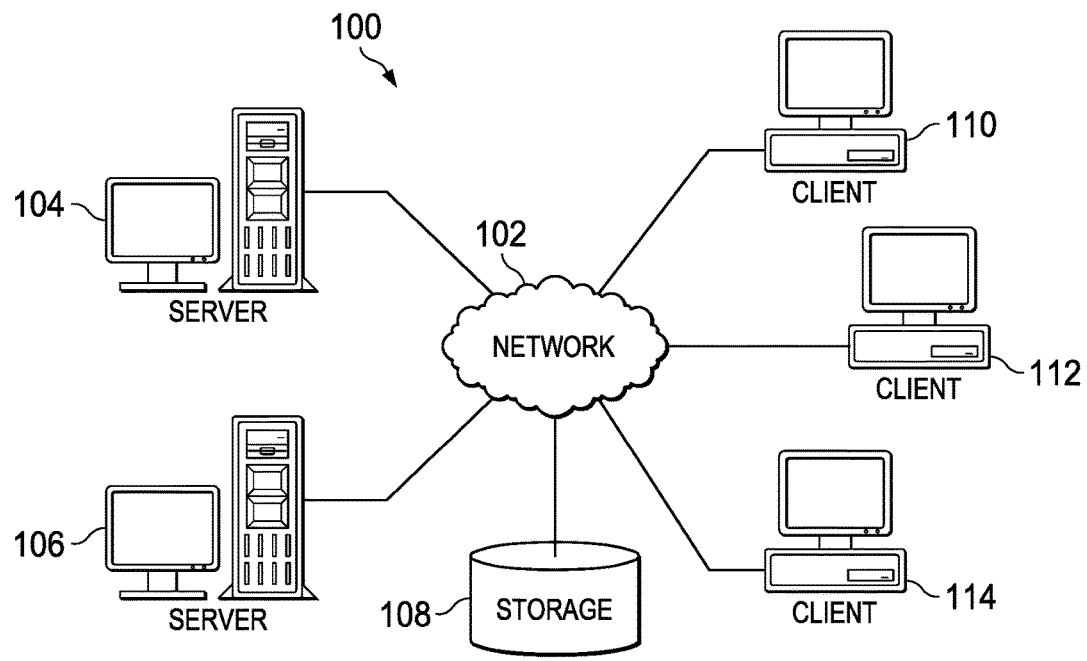
FIG. 1 depicts an exemplary block diagram of a distributed data processing environment in which exemplary aspects of the illustrative embodiments may be implemented.
Figure 2:
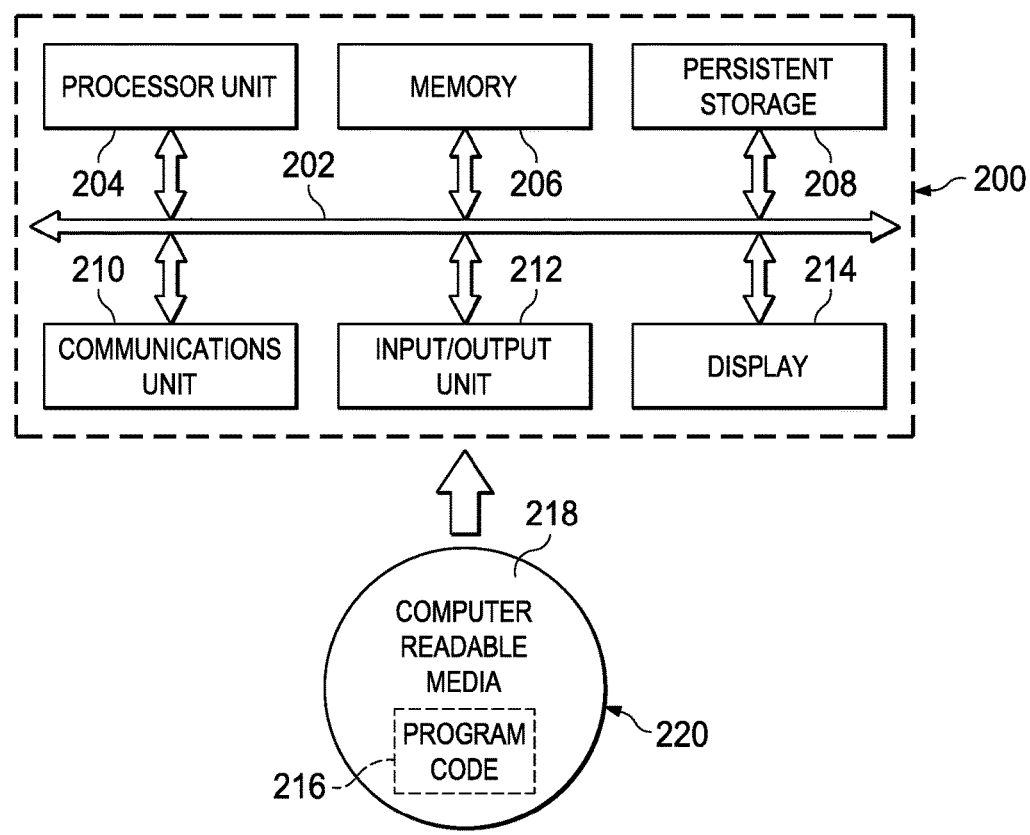
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
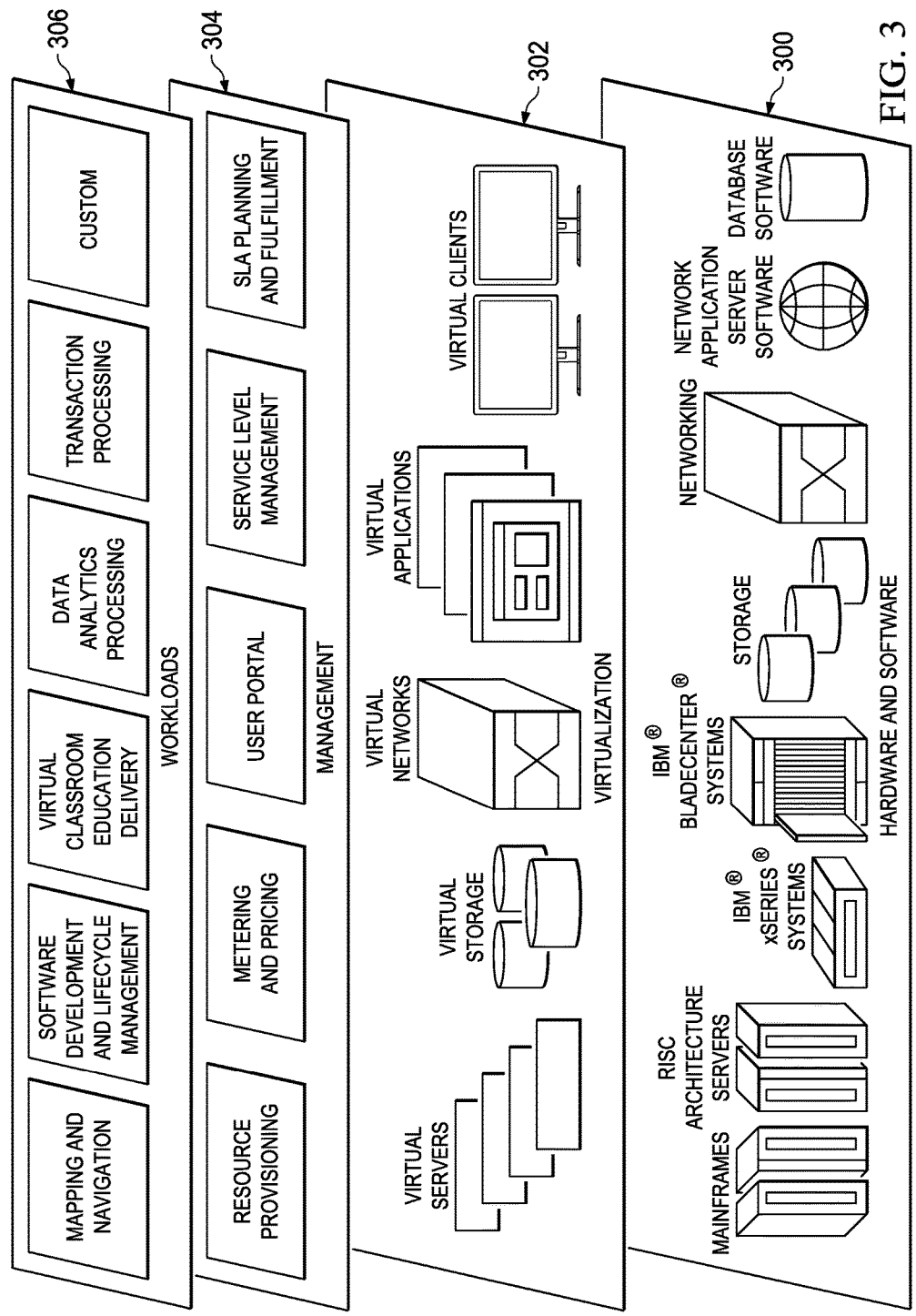
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

In a non-limiting implementation, representative platform technologies are, without limitation, IBM System X® servers with VMware vSphere 4.1 Update 1 and 5.0.

Representative cloud applications include IBM Sametime® Meetings, IBM SmartCloud for Social Business, or the like.

Cloud Deployment Technologies

It is known to provide an appliance-based solution to facilitate rapid adoption and deployment of both Infrastructure and Platform as Service offerings. As described above, one such appliance is IBM Workload Deployer (IWD), and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
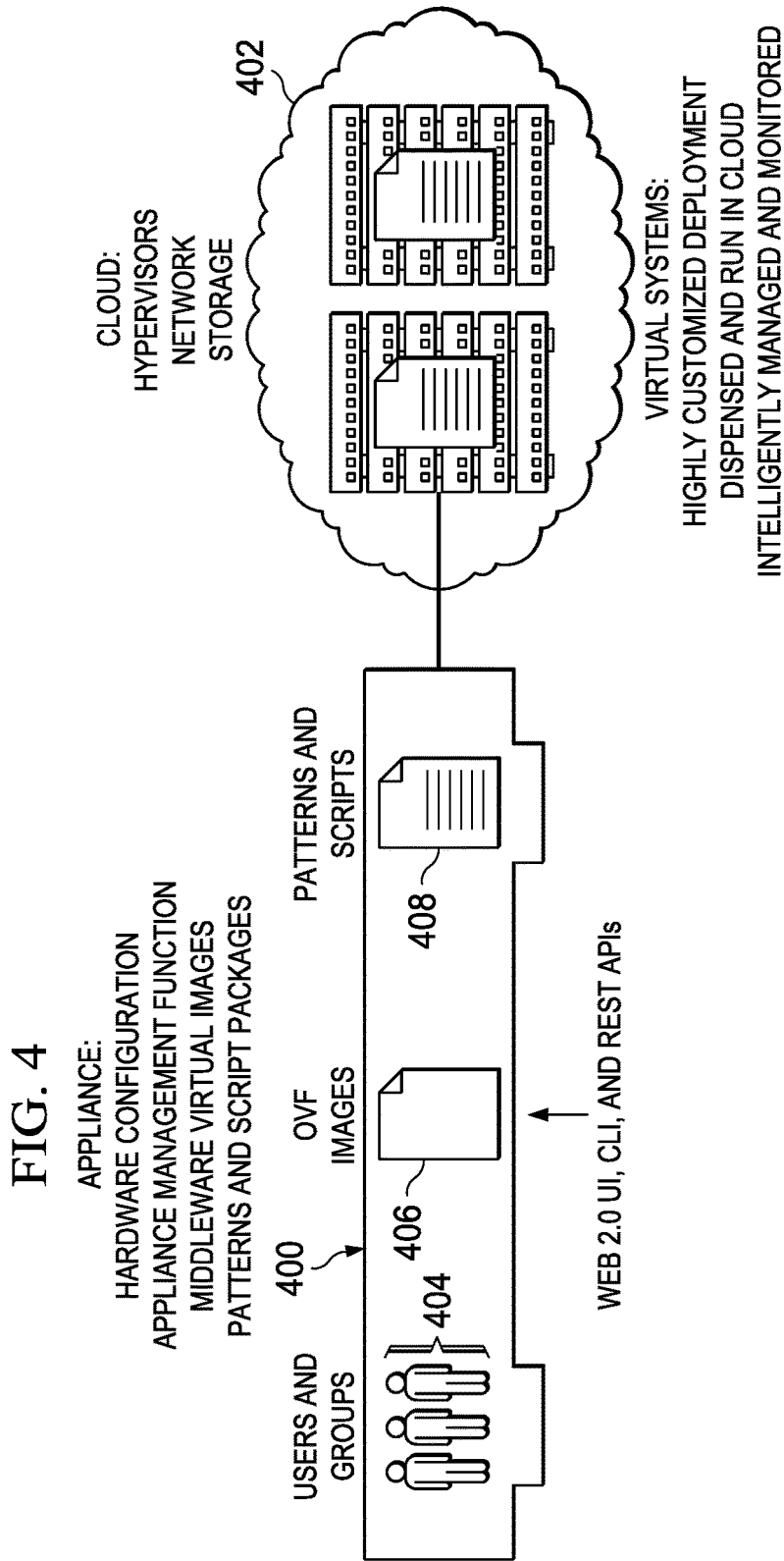
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. As will be described in more detail below, preferably patterns are structured according to the TOSCA specification. The management function and interfaces provide a template-based approach to construction that permits the rapid creation and modification of an otherwise complex set of hardware and software components. In particular, the use of patterns allows an organization to construct an individual element or integrated solution one time, and then to dispense the final product on demand. Typically, there are two types of patterns: virtual system patterns provide the most flexibility and customization options of the two types. It consists of an operating system and, potentially, additional software solutions, such as WebSphere® Application Server. Virtual application patterns are optimized and are constructed typically for the purpose of supporting a singular workload.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

Figure 5:
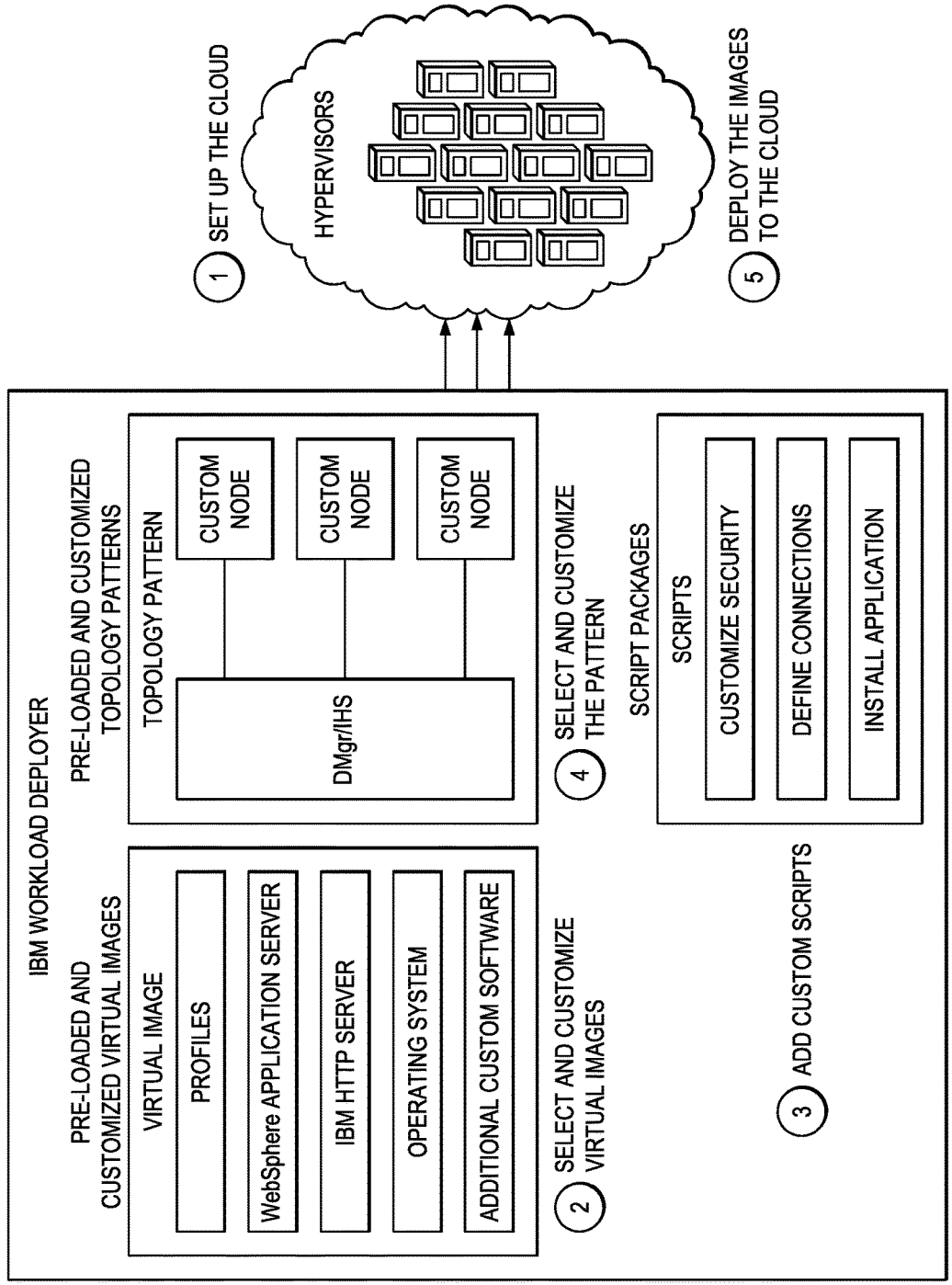
FIG. 5 illustrative representative functional components of the network-based appliance.

FIG. 5 illustrates how the appliance can be used to build a custom private cloud. At step 1, the hardware, hypervisors and networking for the cloud are identified. At step 2, the user selects and customizes the virtual images. At step 3, the user adds one or more script packages as needed to customize the deployed middleware environment. At step 4, pre-installed or customized patterns are used to describe the middleware topology to be deployed. Patterns can be built from virtual images, e.g. using a drag-and-drop interface. At step 5, the virtual systems are deployed to the cloud.

The references herein to IBM Workload Deployer are exemplary and should not be taken to limit the disclosed technique, which may be implemented on any appliance (or, more generally, machine) having the general characteristics and operating functionality that has been described. Specific references to IWD should be construed to include both the above-identified product, as well as other technologies that implement the functionality referenced above.

As additional background, the Oasis Topology and Orchestration Specification for Cloud Applications (TOSCA) is a specification designed to enhance the portability of cloud applications and services. It enables the interoperable description of application and infrastructure cloud services, the relationships between parts of the service, and the operational behavior of these services (e.g., deploy, patch, shutdown), independent of the supplier creating the service and any particular cloud provider or hosting technology. Among other benefits, TOSCA enables portable deployment to any compliant cloud, and facilitates smooth migration of existing applications to the cloud. Using TOSCA, cloud applications can be modeled, shared, deployed and managed, seamlessly, amongst products and cloud platforms, from multiple vendors.

A TOSCA document is a descriptor that describes all application components to be deployed to the cloud and their interrelationships. In the descriptor, each application component typically is uniquely identified by an identifier composed of a name, version, architecture, as well as a vendor of the component. This identifier is useful as a search key with respect to a database of information; as will be described below, one such database is a database of known defects and/or vulnerabilities for that specific application component.

It is known to provide a cloud management platform that implements TOSCA-compliant solutions. As one example, the cloud management platform is the IBM® SmartCloud® Orchestrator open cloud management platform, which leverages additional standards technologies such as OpenStack, and OSLC (Open Service for Lifecycle Collaboration). A management platform of this type typically comprises three main functional layers: an infrastructure services layer, which is preferably based on OpenStack, for provisioning, configuring and managing storage, compute and network resources, a platform services layer, which includes virtual machine image lifecycle management capabilities and pattern services, and an orchestration services layer. As described above, a "pattern" provides deployment and management instructions for the business service. A pattern preferably is an XML-based definition of an infrastructure configuration required to provision and managed the various resources (e.g., compute, networking, storage, OS, middleware, and the like) for a specific application (or application-type) workload. The orchestration services layer provides a business process management solution.

Of course, the above-described cloud management environment is not intended to be limiting, as the techniques herein may be implemented in other (open, closed, or hybrid) environments, and/or using other deployment technologies (whether open or proprietary, or mixed).

Context-Based Cloud Security Assurance Service

With the above as background, the subject matter of this disclosure is now described. This subject matter is sometimes referred to herein as a "context-based cloud security assurance service" or a "security assurance service or system" or just the "service" or "system" as a short-hand. Without limitation, the subject matter may be implemented within or in association with a cloud deployment platform system or appliance (FIG. 4) as has been described, or using any other type of deployment systems, products, devices, programs or processes. A representative cloud application platform with which the security assurance service may be implemented includes, without limitation, IBM® Smart-Cloud Orchestrator, which as noted above is a platform system specifically design and tuned for running applications, and that supports the use of patterns for easy deployment into its cloud environment. The reference to this commercial system is not intended to be limited, as the security assurance service of this disclosure may interoperate with any cloud infrastructure.

The techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

The following is a high-level description of the cloud security assurance service. Generally, the service operates generally to gather (or otherwise obtain from other data sources) information about available cloud platforms, topologies and capabilities. The service also identifies security capabilities that are available to be setup. These security capabilities include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others. Preferably, the service simplifies (or abstracts) the available capabilities into easy-to-understand security assurance categories for the environment's existing topology.

The assurance service exposes the categories to the user (during application deployment) as "templates." Preferably, the service is deployed with a set of default templates. Preferably, a template defines the requirements for a particular security assurance level, e.g., a "medium security" template might include the following specified requirements: "SSL, SIEM, IPS, disk encryption, multi-factor authentication, no resource segregation and isolation." A security administrator (for the service) might later alter the set of default templates (by adding in different templates), or possibly to change the configuration of an existing templates to add or remove requirements. Preferably, however, the security assurance service does not need to interpret the specific requirements of a template; rather, and as will be described in more detail below, the security assurance service interprets the "context" of a particular deployment to make a determination regarding what security resources (and/or their particular settings) satisfy the requirements of the template. In this approach, the templates are loaded into the assurance service (e.g., by security experts) and are meant to be highly instructive to the system. In use, preferably the templates get exposed to the end user with simplified names (or identifiers, descriptors, or the like), such as "high security," "medium security" or "low security." Preferably, these terms are presented (verbatim, more or less) to the end user. It is not required that the end user have an understanding of the resources (or their operational characteristics) underlying the security assurance level represented by the template. The system, however, understands these details and operates to apply specific capabilities and controls to translate the user-selected specification (e.g., "high security") into granular requirements. This intentionally simple end user terminology might be exposed to the end user in the form of a button or other control, and, as noted, the terminology presented to the end user is not intended to describe the particular underlying requirements or resources that are expected to provide the security assurance level. Rather, the end user only needs to know what generalized assurance level he or she desires to implement for the application under deployment.

Based on the requirements specified, a template has a given set of one or more security configuration changes associated therewith. As will be described, the end user (typically the application developer) selects one or more of such security templates that he or she would like the service to configure/provision the application against. The service may provide a recommendation to the user in this regard. Based on the user selections, the service then interprets the requested one or more security assurance templates and, in response, the service generates a concrete list of one or more security configuration changes (typically changes/updates to security settings to existing security infrastructure). Optionally, the service also generates a note to the security administrator(s) of the capabilities being used for the application. During the application deployment, the service applies the security changes, preferably using REST-based (or equivalent) interfaces to existing (configured) security products; in addition and, as necessary to meet the security assurance level specified by the template(s), the service may also deploy new security software instances (as applicable and if licenses are available). Further, and once again as necessary to meet the security assurance level selected, the service may also provision hardware and network environments, preferably using existing cloud facilities, and as needed by the application. In this manner, the security assurance service creates a context-specific secure cloud application zone for the application-being-deployed. Preferably, the application deployment platform is called-back when the security configuration update completes; the platform then completes the deployments. The newly-deployed and secured application is then activated (possibly by the service directly).

As described, the assurance service as described herein preferably operates in a context-based manner, taking into consideration the "context" in which the application is to be deployed. Representative "context" information includes, without limitation, the nature of the target platform, the nature of the environment in which the workload is anticipated to execute, the nature of any compliance or other regulatory requirements for the workload, any company security requirements (configured by administrators), context of the deployed application (software, configuration, topology, etc.) that will or may affect how security resources interact with the application, and so forth. Thus, for example, if the workload is being deployed on the Amazon® cloud (which is public), the service might consider public cloud requirements, such as SSL communication for all traffic, even though such requirements would not necessarily be enforced in a private cloud. As another example, if the workload is running in a test or development environment, the service may only provision minimal controls around data, as the application (in this context) would not be handling real (live) customer data. As yet another example, if the workload needs to be PCI-compliant, then the service may provision that workload only on a certain network but not allow (or otherwise block) the move of the workload to a network or VLAN that is not secure. Of course, the above are merely representative examples. Preferably, the security context information is gathered by the security assurance service directly, or such information is made available to the security assurance service from other connected data sources that have that information (or access to that information).

Figure 6:
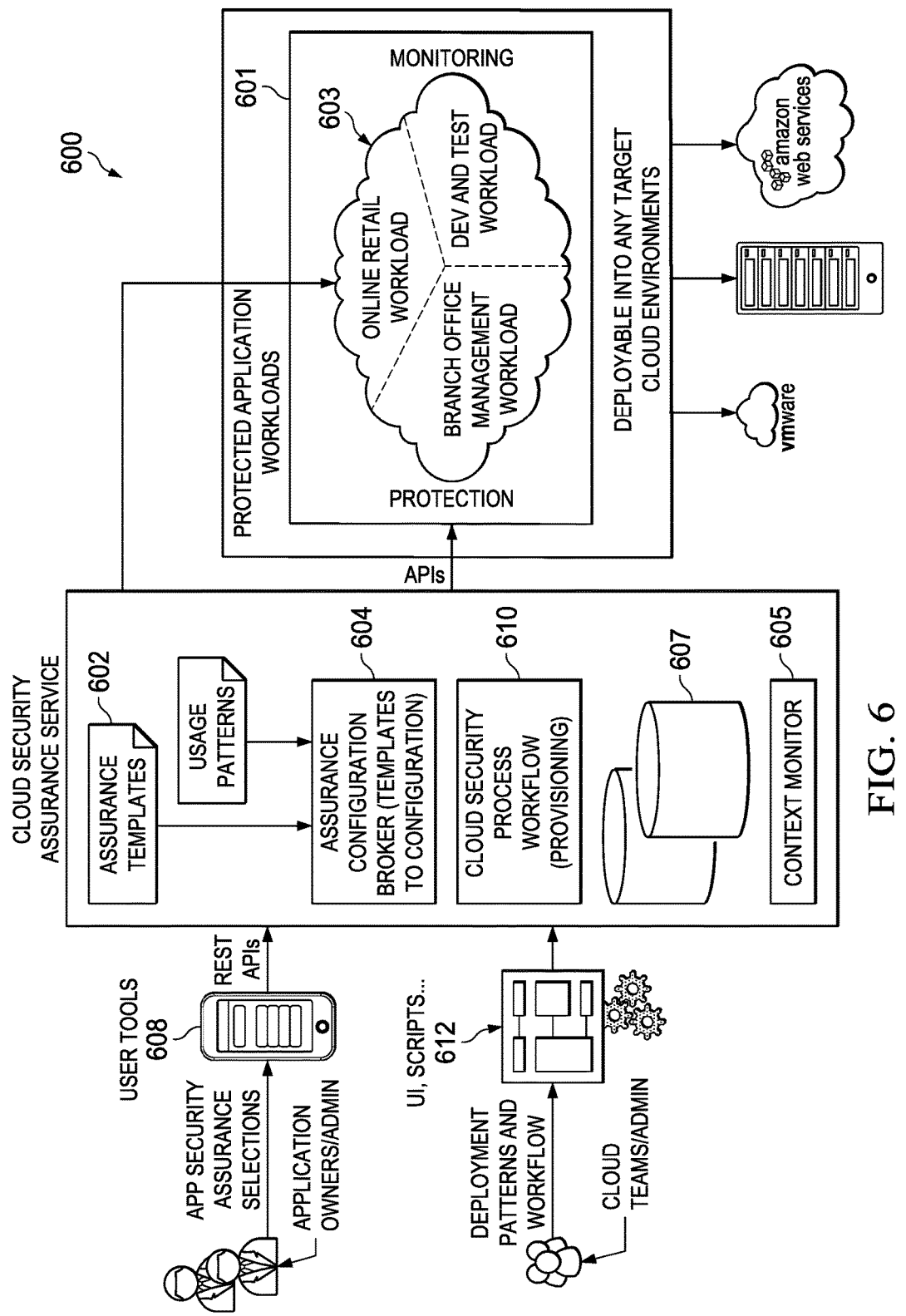
FIG. 6 illustrates a block diagram of the basic operational components of the security assurance service of this disclosure.

FIG. 6 illustrates the basic components of a cloud security cloud assurance service 600 of this disclosure according to one embodiment. Reference numeral 601 illustrates the cloud platform and the systems running on the cloud platform (i.e., the customer workload). The cloud platform and its associated customer workloads are protected by the assurance service, which provides for a centralized or federated service that manages all (or defined ones of) security resources impacted by application deployment(s) into that platform. These resources may be quite varied and include, among others, reverse proxies, HTTP servers, authorization updates, addition of new identities, provisioning of VPNs, log integration with a SIEM solution, DMZs, firewall configuration to open ports, and so forth. As will be described, preferably the service invokes remote interfaces (e.g., REST-based interfaces) to update configurations for the security resources. The determination of which security resources get updated and how depends on the template-based approach as described. The various workloads 603 executing on the cloud platform are set up by the cloud platform customer(s), typically in advance. The cloud platform is represented by the icons such as IBM Pure™, Amazon® web services, VMWare®, which are merely representative.

The cloud security assurance service 600 includes a context monitor component (or "context monitor") 605 that is operative to query the cloud platform for available capabilities, and catalogs them in an assurance service database 607. In operation, the context monitor 605 queries the cloud platform 601 using cloud-provided application programming interfaces (APIs) to determine the resources available, as cloud platforms generally expose this information in this manner. The context monitor then maps available software to security capabilities. The product-to-capability mapping may be provided by the cloud platform directly, or that knowledge may be embedded in the assurance service database 607. Thus, for example, the cloud platform may include IBM QRadar, which provides SIEM capability. The assurance service includes configuration information that specifies which security assurance levels require which particular capability. Thus, for example, a "high" or "medium" assurance level may require a SIEM solution while a "low" level does not. As noted above, the requirement(s) for a particular security assurance level are linked to a predefined template, preferably in advance (by a security expert). As described, and in this particular example scenario, when the end user picks a particular security solution (e.g., "high"), the security assurance service leverages the cloud platform to install the product (or to adjust its security settings if already installed) to satisfy the SIEM requirement for that security level.

To that end, the service 600 provides the security assurance templates 602. As noted above, preferably a default set of templates 602 are provided by the service, and each template defines the requirements for a particular security assurance level. Typically, templates will be of varying types or categories. As explained, a template is highly instructive (to the system) in that it includes a defined set of requirements for the security assurance level. Thus, a "medium" security level may be specified in a template that defines requirements such as "SSL, SIEM, IPS, disk encryption" and so forth. Preferably, and as described above, the service does not need to interpret these requirements; rather, the service interprets the context of the deployment (as specified or ascertained by the context monitor component) to make a determination regarding what security resources (or their settings) satisfies these requirements. Preferably, the template(s) come pre-configured. The set of templates 602 may be augmented with additional templates, or a particular template's requirements may be adjusted as needed.

Preferably, and as used herein, the security assurance templates 602 are modules within the service that provide easy-to-understand security categories or profiles, and their associated security levels, such as "high/medium/low internal network security" and "high/medium/low firewall security," and the like. The service 600 also includes an assurance configuration broker 604, which identifies the security goals of selected templates, and that operates to translate selection of a template into detailed configuration steps, preferably based on system configuration and context of available resources. This translation operation is described in more detail below. Further, the service preferably includes (or has associated therewith) a security management interface 608 (e.g., cloud tooling UI, such as IBM SmartCloud Ochestrator), which is a configuration point that is used to add or remove security templates, to provide manual configuration of managed security resources, and/or to override (under permitted circumstances) a security template selected by an end user. The security assurance service also includes a cloud security process workflow 610, which is a module that invokes appropriate (e.g. REST-based) interfaces to apply changes to underlying security infrastructure (security resources) as indicated by the configuration broker 604. An assurance pattern module 612, which provides an administrative interface, is a cloud-specific service that coordinates application deployment and provisioning with the security assurance service 600. Typically, the assurance pattern module 612 comprises an administrative interface component of the cloud application platform, although this is not a requirement. The assurance pattern module 612 queries the assurance service for available assurance templates 602 based on the application being deployed.

In FIG. 6, the application owners/administrators at the top left represents the application deployer(s); these are individuals who only need to have access to the easy-to-understand security assurance level templates (by category/security level). The cloud teams or other administrators at the bottom left represent individuals either who create the templates, or who are provided the capability to add new templates and/or modify the particular requirements in a pre-configured template. The cloud teams or other administrators interact with the system or service through an administrative interface. Each of the above-described components typically is implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the security assurance service be executed by a particular component as named above, as the functionality herein (or any aspect thereof) may be implemented in other or systems.

Figure 7:
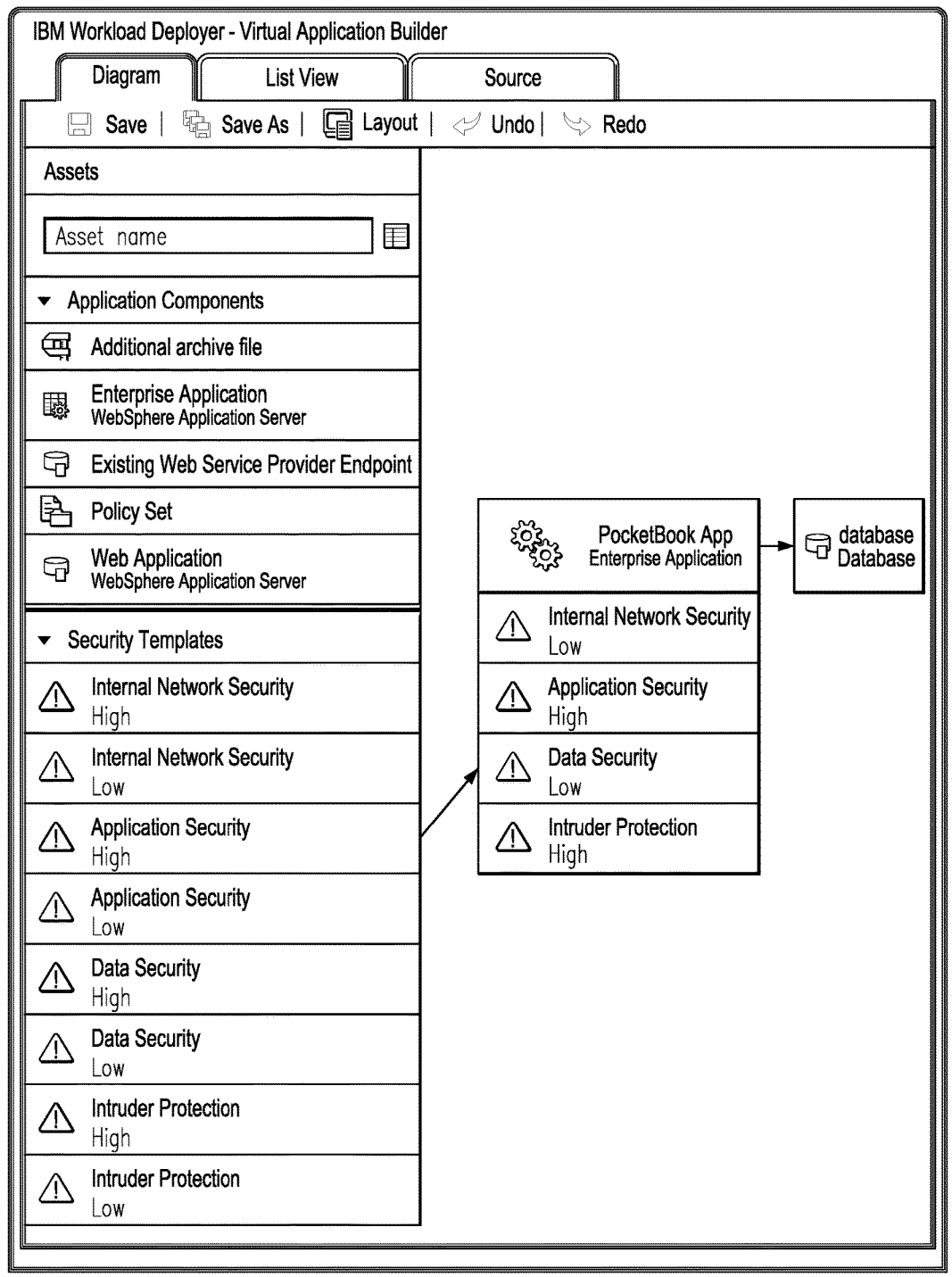
FIG. 7 illustrates a representative display page of the security management interface component of the security assurance service.

The security assurance service may be implemented by a cloud service provider that operates infrastructure for a private cloud, a public cloud, or a hybrid cloud. This security assurance system deploys and manages security infrastructure. Preferably, and as described above, the assurance system interacts with the cloud's security administrator (or the like) through an administrative interface, and with the application owner through cloud tooling UI. Preferably, the application owner interacts primarily with the cloud tooling UI (see FIG. 7, which is merely representative) to define the high-level security requirements and to deploy the application. FIG. 7 is representative of an editor that is web-based, although the particular implementation of the editor (or an equivalent application that facilitates presentation and management of the templates in the manner described) may be of any type.

Using the cloud tooling UI (or its equivalent), the user also may query the cloud application environment (e.g., to request details about the application being deployed) and, in response, receive information about one or more available security capabilities available in the cloud application environment (e.g., particular security resources appropriate for the application being deployed). These available capabilities may include, e.g., available hardware, available software, existing licenses, and available licenses.

Thus, and as has been described, different types of users may interact with the service in different ways. In one embodiment, a first type of user (e.g., the application owner) works with the service by viewing and interacting with the template, while a second type of user (e.g., the security administrator) works with the service by viewing and interacting using one or more security administrative views, e.g., of security changes associated with the selection of templates by the first type of users. A security administrative view enables the system to receive inputs from the security administrator that may trigger enforcement of one or more security administration actions with respect to configuration of one or more security capabilities in the cloud application environment. Such inputs may include, for example, an input to approve a pending security configuration change, an input that overrides a selection by a first user of a template, or that overrides a selection of a security capability associated with a template, or that inhibits deployment of an application into the cloud application environment when a template having a minimum security assurance level associated therewith has not been selected by a first user, or the like. The security administrative view may also provide one or more additional administration functions such as: configuring a new template or modifying an existing template, using security analytics to manage application deployment based on enterprise security policy, defining security requirements for the cloud application environment, auditing security capabilities available in the cloud application environment, and the like. In one embodiment, an input received in the security administrative view initiates a security scan of the cloud application environment, and the results of that security scan (e.g., any security capability gap analysis) may then be presented to the administrator. As another use case, an input may also be used to retroactively apply an upgraded template to an existing application that has been deployed in the cloud application environment.

In one particular (but non-limiting) implementation scenario, an enterprise has an associated private cloud (implemented within a cloud service) that is managed by a cloud application platform. That platform may then be augmented to interoperate with (or to actually include) the security assurance service of this disclosure.

More generally, the security assurance service may be implemented by an enterprise in a standalone manner. It may be available as a managed service provided by a cloud service or some other service provider.

As described, preferably the service operates by having an end user provide a generalized specification of a security level (e.g., "high network security") that the service then uses (after interpreting application requirements and available resources) to generate a security-optimized deployment for an application. Typically, and as noted above, the application is being deployed into an existing environment, and the security assurance service operates to define and/or tailor the security configuration changes required for that existing environment (into which the application will be deployed). The security-optimized deployment for the application is sometimes referred to herein as a secure context-based "cloud application zone."

As described, "security levels" as used herein are sometimes referred to as "security assurance levels." These levels, as noted above, are exposed as easy-to-understand or "coarse" grained descriptors ("high" or "low"), as compared to more fine-grained specificity that might otherwise be known or available to, say, a security expert. The terms "coarse" or "fine" are relative phrases, but the notion of a "coarse" designation of a security assurance level is one that merely provides the basic information available to the user who might not otherwise know or be able to ascertain (or care about) the explicit security requirements underlying a particular "coarse" security assurance level. It is sufficient for the user (the application owner) in this circumstance to know only that the security assurance level he or she desires (for a particular category) be "high" or "low" or some other such classification (however delineated). Thus, the term "high" (in reference to a particular coarse security assurance level) may be designated in the alternative by a numerical value, some other identifier or designation. As explained, these terms, however, are meant to be presented, more or less verbatim, to the end user. The system then applies specific capabilities and controls to translate the user-selected security solution into the granular requirements for the underlying security resources. A preferred way to specify the solution is by a button or other common display artifact.

In a representative embodiment, the service exposes, provides or interoperates with a set of security templates, which may be categorized according to type. These templates are provided by the assurance template module shown in FIG. 6. Thus, for example, the service may expose security templates having the following categories: "Internal Network Security," "Application Security," "Data Security" and "Intruder Protection." These are merely representative. A particular template category may then be identified according to a defined security level: such as "Low" or "High." The service may provide just "Low" or "High" templates, or it may provide further levels (e.g., Low, Medium and High, or further more specific levels, etc.). A particular enterprise application being deployed thus may have one or more such security templates associated therewith, each defining a category and a specified security level. Thus, for example, a particular application being deployed may have the following specification: Internal Network Security (Low), Application Security (High), Data Security (High) and Intruder Protection (High). A web-based or other configuration interface may be used to specify the one or more security templates that are to be associated with a particular application being deployed. This interface may be associated with a conventional workload deployment tool, such as IBM® Workload Deployer Virtual Application Builder. FIG. 7 illustrates a representative user interface for this purpose, which may comprise a portion of the security management interface (see, FIG. 6). As noted above, this interface provides the configuration point for adding or removing security templates, providing manual configuration of managed security resources, or (if configured) overriding security templates selected by end users. In an alternative embodiment, the categories and security levels are defined automatically or programmatically, or such information is made available from a repository of such data published by another source.

As has been described, the template defines a set of requirements that provide a specific "security assurance" level, with that assurance level then being realized or implemented with respect to one or more security resources. A security resource may be a system, device, appliance, program, process or other computing entity within the security infrastructure. Preferably, the security assurance service interprets the context of the deployment to make a determination regarding what security resources (and what settings therein) are needed to satisfy the requirements of a particular template. Thus, and based at least in part on the particular deployment context, a security template has associated therewith one or more security configurations (security resource settings) that implement the category (and at the specified level) for that context. Preferably, and as described above, these security configurations are identified by the security assurance configuration broker component (see, FIG. 6), which takes (as input) the generalized security goals of the selected template and translates that selection into detailed configuration steps (or changes) based on the system configuration and the context of available security resources (as supplied by the context monitor).

Thus, for example, if the application category is "Internal Network Security" and the security level is, say, "Low," the broker determines that the detailed security steps necessary to implement that template might include: (i) creating a "junction" between a front-end proxy server and a back-end Web application server based on application endpoint, (ii) use basic authentication for the junction and configure a trust association interceptor (TAI) in the application server for single sign-on (SSO), and (iii) enable restrictive firewalls, and open ports to the application endpoint. As another example, if the application category is "Application Security" and the security level is, say, "High," the detailed security steps necessary to implement that template might include: (i) run a security analytic tool (e.g., AppScan) against endpoints and halt deployment if any critical vulnerabilities are identified, (ii) instruct the cloud application platform to provision a VPN to host the application in the cloud, (iii) configure access manager policies for authorized roles defined by the application, and (iv) create an additional software-based DMZ in the cloud dedicated to the application. As yet another example, if the application category is "Data Security" and the security level is, say, "Low," the detailed security steps necessary to implement that template might include (i) update application server to use an SSL connection to the database, or the like. As still another example, if the application category is "Intruder Protection" and the security level is, say, "High," the detailed security steps necessary to implement that template might include: (i) configure the security intelligence platform (e.g., IBM® QRadar) log sources, (ii) update SIEM filters for the application, and (iii) update IPS rules for the application. Of course, these are merely representative (non-limiting) examples of the security configuration changes. The particular changes that are implemented by the security assurance service will depend on the implementation and available resources (products, systems, configurations, and the like).

Thus, according to this disclosure, when the cloud provider deploys the application (or initiates the deployment), it notifies the security assurance service of the one or more selected (or otherwise defined or prescribed) security templates. Preferably, the cloud provider also sends the assurance service details of the application. The security assurance service takes the selected templates as guidance, and the broker component then tailors the detailed security configuration changes required for the existing environment to support the application within the selected security constraints that have been specified and the context of available resources (as determined by the context monitor). If desired, these security configuration changes may be presented to a security administrator for verification before being implemented. Upon verification (if that optional operation is implemented), the security assurance service preferably invokes remote interfaces for software configuration. In addition, and if necessary, the service communicates with the cloud provider to obtain information about any prerequisites (of the cloud provider) that may need to be addressed when deploying the application. These prerequisites may include, for example, creation of a VPN, or other security requirements unique to the provider.

A template may also include other information, such as cost information associated with a particular security capability. The cost information in a template may be derived as an estimate of one or more costs associated with a set of one or more security configuration changes in the cloud application environment. That cost information also may be adjusted from time-to-time, e.g., based on changing costs of security capabilities in the cloud application environment, or as a result of other changed conditions. When the system exposes such cost information, preferably cost information resulting from the selection of the templates (e.g., by one or more users) may be collected and presented to permitted individuals in appropriate display views in the editor (or some other application).

The system (e.g., the UI editor) may also provide for the capability to receive information setting a security cost of one or more security changes. Based on this information, the set of templates that are exposed to the user may be adjusted.

Figure 8:
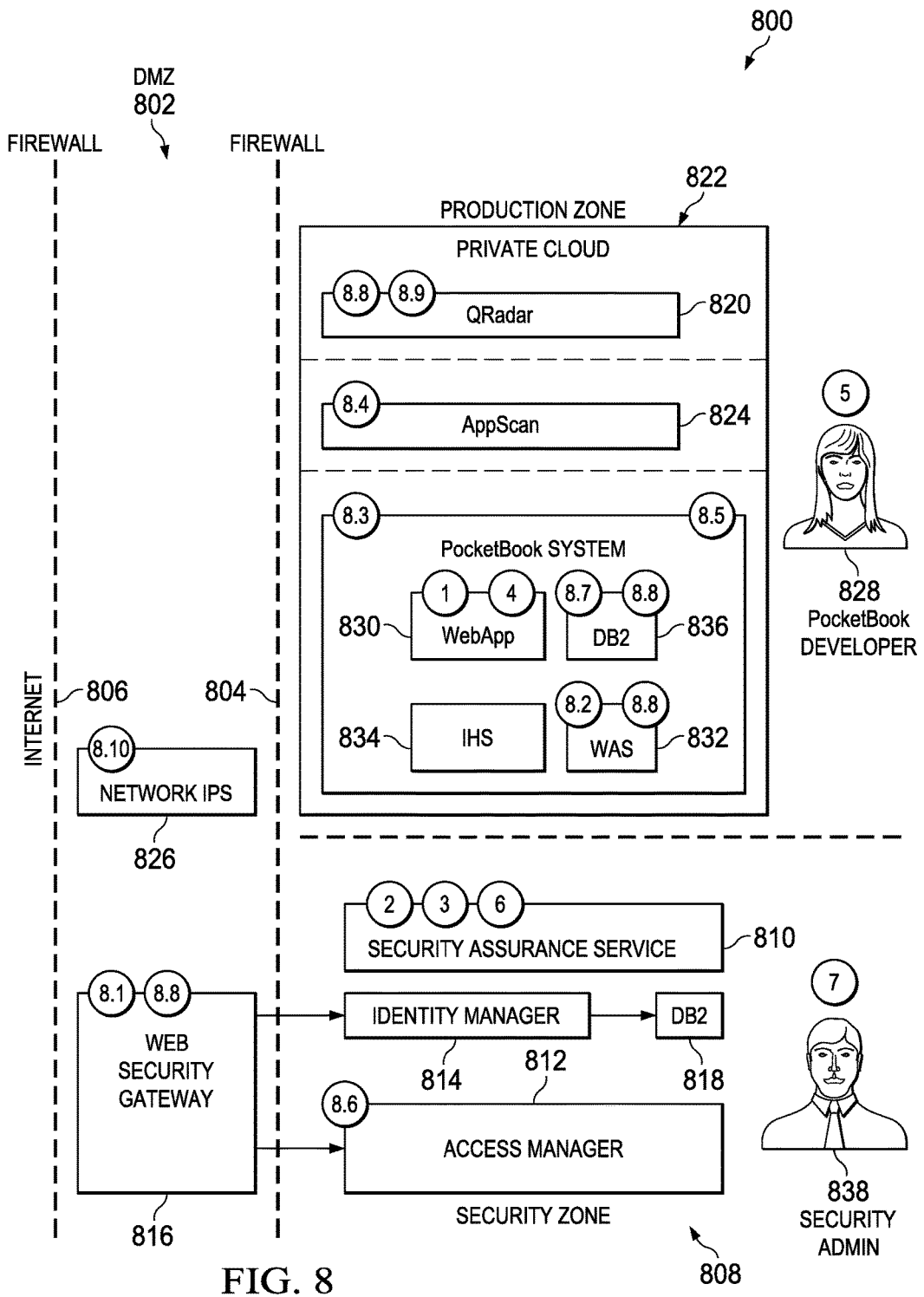
FIG. 8 illustrates how the security assurance service may be used in association with a cloud application platform to facilitate the creation of a context-based security cloud application zone according to this disclosure.

The following provides a description of a representative use case, merely for explanatory purposes. The details of this example scenario are not intended to be limiting, and all products and services are specified for discussion purposes only. As illustrated in FIG. 8, an enterprise (Acme Bank) has a Production Zone 800 implemented in a private cloud environment. The private cloud is accessible from the Internet via a DMZ 802 located between a pair of firewalls 804 and 806. According to this disclosure, a Security Zone 808 hosts the security assurance service 810. As shown, it is assumed that the enterprise also has a comprehensive suite of security software already deployed. This suite includes, for example, IBM Security Access Manager (ISAM) for access management 812, IBM Security Identity Manager (ISIM) for identity management 814, IBM Security Web Gateway appliance (the DMZ for secure proxy) 816, IBM DB2 database for user storage 818, IBM QRadar SIEM 820 hosted on IBM PureApplication, a standardized cloud application platform 822, IBM Security AppScan 824, and a network IPS 826 in the DMZ 802. Jane 828 is an application developer/administrator at Acme and is tasked with deploying the PocketBook™ application 830. To that end, and using the cloud application platform tools, Jane builds a virtual system that includes appropriate enterprise nodes (e.g., Red Hat Enterprise nodes (RHELs) for various components or application instances, such as (in this example scenario) a node 832 for a WebSphere Application Server (WAS) instance, a node 834 for IBM HTTP Server (IHS) instance, and a node 836 for IBM DB2 instance, etc. The virtual system preferably encompasses the pieces needs for application functionality and scalability (for the new application) in the Acme private cloud. In this example scenario, however, it is assumed that the cloud pattern created by Jane does not cover or otherwise surface the security pieces that are needed to protect what will be an externally-facing web application. Thus, the security assurance service of this disclosure will be needed.

As also seen in FIG. 8, John 838 is a security architect at Acme and is tasked with security for production systems at the company. To assist with system-wide configuration, John deploys the security assurance service 810 of this disclosure (see, e.g., FIG. 6) and, in particular, he configures the service to manage all software-based security-related resources in the cloud, together with integration with existing deployments such as (in this example scenario) ISAM, ISIM, Web Security Gateway, QRadar, AppScan and IPS. When Jane 828 uses the cloud pattern editor (provided by the PureApplication system 822) to prepare the PocketBook application 830 for deployment, it is assumed that she is not familiar with the internal workings of the security deployments to properly configure those pieces of the security puzzle. Jane, however, does know (or require) that this application needs to be highly-secured for any communication with the Internet, but perhaps not as secure with respect to requests from the internal network. Using the techniques of this disclosure, Jane selects one or more security templates that are needed (or desired) to create the secure cloud application zone for this newly-deployed application. As noted above, preferably the security assurance service integrates with the other cloud deployment tooling such that, during deployment, Jane can select from one or more easy-to-understand security assurance templates alongside other deployment modules (see, e.g., FIG. 7). In this example, Jane is assumed to have selected the four (4) security modules shown in FIG. 7 and described above. As explained above, the security assurance service takes the selected templates as guidance in tailoring the detailed security configuration changes required for the existing environment (FIG. 8). The application is then deployed within the configured cloud application zone with its context-based security assurance.

FIG. 8 illustrates the detailed operational steps. At step (1), and using an application server interface, Jane creates a pattern to deploy the PocketBook application 830. At step (2), the cloud application platform queries the security assurance service 810 for a list of available assurance templates. This query includes information about the application being deployed (e.g., a "J2EE application with a single context root, built on WebSphere Application Server (WAS) and using DB2"). Given the specification, the security assurance service 810 continues at step (3) to provide templates of type "Internal Network Security," "Application Security," "Data Security" and "Intruder Protection," along with "high" or "low" security level options for each (see, FIG. 7). The type(s) returned by the security assurance service (and their levels) may vary depending on the application specified, the available resources, and the like. At step (4), the cloud application platform displays the simple security templates in a configurator (e.g., IBM Workload Deployer pattern builder) for easy user selection. At step (5), Jane selects the four templates, e.g., based on her general feeling that the internal network is secure but frequent attacks and advanced persistent threats (APTs) are likely from the external network. At step (6), and preferably upon application deployment, the cloud application platform communicates the selected security templates to the cloud service, preferably along with the details of the application being deployed. At step (7), the security assurance service generates a list of configuration steps and presents the list to John for confirmation. The presentment of the list to John (as opposed to Jane, or to some other person) is not a requirement, but it may be a typical use case. At step (8), the security assurance service remotely applies the configuration changes to create the context-specific secure cloud application zone for the to-be-deployed application. At step (9), and the when the zone creation is completed, the security assurance service notifies the cloud application platform (e.g., via a callback) that the configuration settings are complete, and that the cloud application platform can continue the deployment process. The deployment is completed by the cloud application platform in the usual manner.

Without meant to be limiting, in this particular example scenario (involving the PocketBook application), the security assurance service applies a number of configuration changes, and these were detailed above. Thus, for example, at sub-step (8.1), the service creates a WebSEAL junction in the Web Security Gateway 816 for the new application endpoint. At sub-step (8.2), the service configures the junction and the WAS instance 832 to use basic authentication for internal communication. At sub-step (8.3), the service enables firewalls on the newly-deployed RHEL instances, opening only required endpoint ports. At sub-step (8.4), the services runs AppScan 824 against the newly-deployed application (in a sandbox if needed) and reports back to the user or security administrator. At sub-step (8.5), the service provisions a VPN for the new deployment, e.g., through the PureApplication system 822. At sub-step (8.6), the service updates Access Manager 812 for authorized users to the new application. At sub-step (8.7), the service updates DB2 818 and 836 to use an SSL connection from WAS. At sub-step (8.8), the service configures QRadar 820 log sources from DB2, RHEL instances, WebSEAL and WAS. At step (8.9), the service updates QRadar rules for the new application. At step (8.10), the system updates IPS 826 rules for the new application to complete the configuration of the context-specific cloud application security zone.

This particular configuration as shown in FIG. 8, as well as the ordering of the configuration changes and steps, is merely exemplary. As a skilled artisan will appreciate, if different security templates are selected, and/or if different resources are available, the nature and sequence of the various configuration changes will of course vary accordingly.

The following describes representative or additional capabilities of the security assurance service of this disclosure. One or more of these additional capabilities may be provided as desired.

The cloud security assurance service may analyze an existing security environment to identify interactions for customized configuration steps, e.g., the service may determine that a virtual private network (VPN) may not be necessary in a particular configuration because the network is already isolated by some other device, network or mechanism.

The security assurance service may operate to update configurations based on other deployments. Thus, for example, if a web security gateway is deployed and is already using certificates for other applications, the security assurance service may recognize this and merely upgrade the newly-deployed application to use certificates as well.

Preferably, security templates available in the system (e.g., in a pattern editor) may include wiring and interaction logic. In the context of an end-user WYSIWYG-type editor, wiring refers to connecting two elements (e.g., by drawing a line between them), and is a way for an end user to add a security capability onto his or her application. As seen in FIG. 7, the PocketBook App is wired to the Database. Preferably, the security boxes that show up in the editor have some associated metadata (possibly hidden) that can be used to determine how the boxes interact. As a simple example, if a high-level "Intruder Protection" template has been selected, the metadata may inhibit a lower level template of this type from being applied. As another more complex example, a security administrator may have set a policy that the network must be at least as secure as the application it hosts; then, if the user selects high-level data security, the internal network security may be automatically upgraded (e.g., in the pattern editor) to high-level. Or, in this latter circumstance, the system may inhibit the user from attempting to wire together a "high application security" box with a "low application security" box. Generalizing, and depending on the metadata, the user's attempts to wire elements thus may be allowed or disallowed.

Thus, and in a typical use scenario of the editor, a first template has been selected. In response to the user selecting a second template and an instruction to wire the second template to the first template, applicable security restrictions with respect to one or both templates are then enforced.

Preferably, a security administrator interacts with the security assurance service directly to apply templates to existing deployments, e.g., to upgrade security settings for an application that may have been attacked.

Preferably, the service enables a security administrator to override a particular categorization. As a non-limiting example, a highly-secure bank network may require a higher level of controls even with respect to an otherwise "low-level" security category.

Preferably, the security assurance services records configuration settings and can remove security configuration steps when an application is removed from the system. This security "removal" function preferably also interacts with other systems, e.g., optionally downgrading security levels of other applications if their security has been upgraded only for the application being removed.

Preferably, the security administrator is provided the ability to change security templates available in the service, as well as the ability to change rules around which templates must be used in certain circumstances.

Preferably, the security assurance service interacts with one or more cloud platforms for management of the virtualized resources. Thus, for example, the security assurance service may query existing software catalogs in the enterprise to determine security software installed, as well as their locations and available resources. The service also may try to auto-discover software in the network, or it may query specific security solutions (such as a log manager) to discover other software installed in the system.

Preferably, and if resource consumption from high-level security options are a concern, the security assurance service can estimate overall cost of the selected security template(s) and present this information to the application deployer for approval. Or, a security expert optionally may configure "maximum" and "minimum" total security levels allowed and required for particular types of applications.

Preferably, a security administrator can use the security assurance service to prevent deployment of applications if security templates of minimum security levels have not been selected.

Preferably, the security assurance service can mine patterns between application deployments and commonly selected security levels to automatically suggest security levels for new applications being deployed.

Preferably, the security assurance service can interact or interoperate with security analytics systems or services (e.g., Rational AppScan) during application deployment to gauge overall security level of a deployed application and determine if it fits within an enterprise security policy.

The service also preferably provides for "patching" of security assurance templates, either manually or automatically (e.g., through an auto-update tool), to improve security recommendations based on selected templates, and to retroactively apply new security configurations to existing applications.

Preferably, the service can receive reports or other outputs describing common vulnerabilities or attack pattern files (e.g. APT patterns) and determine if such an attack would be prevented with an existing security configuration. In the event of possible attack exposure, the service then generates and optionally applies configuration changes to protect the environment.

As noted above, preferably the security assurance service operates in conjunction or in association with existing cloud application platform infrastructure including, without limitation, a cloud application platform with workload deployment functionality. In this manner, the security assurance service supplements or works in across the cloud infrastructure to facilitate secure context-based application deployment.

In the example scenario in FIG. 8, the security templates and their associated security configuration changes are implemented during the application deployment process. In that example, the application deployment is initiated, then the security configuration changes are carried out, after which the remainder of the application deployment process contemplates. While this is a typical operating scenario, the security configuration changes may be implemented orthogonally to the actual deployment itself. Thus, for example, the security configuration changes may be implemented in an off-line process before the actual application deployment is initiated. In the alternative, the application deployment may be in initiated and completed, and then followed by a separate execution thread of the security assurance service. Thus, a given context-based cloud application security zone may be created before, during or after actual application deployment.

The tooling required for implementing the security configuration changes for one or more particular security resources (as identified by a particular security template) may be specified or controlled by the template directly, or indirectly.

As described above, permitted administrators may have the ability to update templates directly. More commonly, it may be desirable to define security policies separate from the templates. For example, a "low" data security template may only require SSL, but an administrator may have configured the assurance service (as a matter of policy) to require, say, disk encryption for all deployments regardless of chosen templates. Functionally, this is equivalent to administrators updating the templates as described. Thus, in an alternative embodiment, such administrator changes are stored as policies separate from the templates. Then, to determine how to create the security zone, the system checks the available software and references with template requirements, as well as such administrator settings. Such policies may be system-wide, or they be scoped to certain domains, e.g., all workloads running on a certain cloud, or all workloads built on certain software, or the like.

The above-described subject matter provides many advantages. In particular, the above-described and illustrated techniques of this disclosure provide for a cross-system, template-based approach to use categorization of applications and deployment technologies to securely provision applications into an environment, updating all or relevant security infrastructure (e.g., firewalls, event loggers, directories, reverse proxies, and so forth) with the security settings necessary and/or appropriate to that application and deployment topology. This template-based approach preferably relies on abstract or "generalized" categories, with the service then automatically providing the advanced provisioning in the form of the necessary configuration changes "under the covers."

The approach herein provides a centralized or federated security assurance service that manages and provisions hardware, software, network, and cloud resources as needed for application security. The techniques described take advantage of abstract assurance security templates to augment application development. The templates preferably are context-based that are derived from information on available resources and desired security goals. A list of security templates may be easily customized based on availability of security software in the environment, and/or combined with properties of the application and middleware. The service also interprets abstract merged templates to generate specific configuration steps. The service analyzes existing security and cloud environments to identify interactions for customized configuration steps. The service generates an end-to-end software-defined security environment for newly-deployed applications. The service upgrades security for other applications if impacted by a security requirement of the new application. The service enables automatic creation of security solutions as needed for application security requirements, such as creation of a VPN or DMZ, or addition of firewalls. The described approach enables distillation of a list of pending security configuration changes that a security expert would understand, and also provides for optional confirmation and approval of such changes. The template approach also easily integrates with other cloud deployment tools, such as application pattern tools.

The assurance service can be queried with details of the application to be deployed to determine available security measures appropriate for that application. The assurance service preferably is centrally-managed to provide a higher or lower level of security assurance. The approach enables a security environment to be de-configured when an application is un-deployed. The service also enables lowering of security levels for impacted applications when a higher-security level application is de-configured. The service also enables real-time interaction management of related assurance templates to provide user interface (UI) capabilities, such as wiring, or mutually-exclusive templates (e.g., addition of SSL may affect key length for different assurance levels). The service provides for auto-discovery or integration with a software repository to identify available security software and licensed resources for selection of available assurance templates. Preferably, the service provides for administrative capability to override applied security templates, on a per-application basis. The approach enables estimation of system-wide costs of security configuration changes, as well as presenting those costs to the user in an easy-to-understand format. The service also enables templates to be set around the cost of security settings, e.g., setting a maximum level to the security environment cost, in which case the end user can the select only a subset of security assurance capabilities. The approach enables the user to establish a centralized security policy to prevent deployment of applications if security templates of minimum security levels have not been selected.

The service provides for analytics that can be used to suggest security templates, e.g., based on templates used in the past. The use of security analytics during application deployment provides a useful way to determine if the application deployment fits within the enterprise's security policy.

The service also provides for retroactive application of upgraded security templates to existing applications. The service also enables integration with systems that perform security scans or output security intelligence reports to facilitate identification of gaps in system protection, and to recommend and optionally automatically apply missing configurations or products.

As described, the approach herein may be implemented manually or in an automated manner, in whole or in part.

While a preferred operating environment and use case (a cloud deployment appliance or platform) has been described, the techniques herein may be used in any other operating environment in which it is desired to deploy applications or other services while enforcing a given security context.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment as described above, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to a technology or technical field, namely, computing entities that manage cloud deployments, as well as improvements to the functioning of the application deployment mechanism itself, namely, by extending its conventional functionality to be security-context aware based on easy-to-understand templates having associated instructions for security configuration tooling changes).

The particular nomenclature of a "template" as used herein should not be deemed limited to any particular format or structure, as the notion is intended to refer to any construct (irrespective of structure or form) that includes the type of information identified (the pre-configured security requirements associated with a particular security assurance level), that preferably is specified with a simple-to-understand reference (e.g., "high security"), and that is adapted to be translated by the service/system (typically along with the system configuration, etc.) into the granular requirements necessary to implement that level of specified security. Depending on implementation, a "template" may comprise a set of configuration data having these properties and characteristics.

Having described our invention, what we now claim is as follows.

The invention claimed is:

1. A method for context-based security assurance in a cloud application environment, comprising:
providing a security assurance service by which first users interact with a cloud management platform associated with the cloud application environment, the security assurance service providing the first users with sets of templates, wherein a template has associated therewith a security assurance level that is specified by a set of general security requirements, at least one of the set of general security requirements being specified in the template in a manner that does not expose to a first user at least some specific security tooling requirements necessary to implement the security assurance level security requirement;
providing at least one second user, distinct from the first users, with a security administrative view of security configuration changes associated with selection of templates by the first users; and
responsive to receipt of input from the second user via the security administrative view, enforcing a security administrative action with respect to configuration of one or more security capabilities in the cloud application environment;
wherein the input includes information that specifies a security policy distinct from the template, the information including at least one additional specific security tooling requirement that the second user deems necessary to implement the security assurance level security requirement and that is not otherwise specified in the specific security tooling requirements;
wherein enforcing the security administrative action includes applying to the template the security policy specified by the second user such that a set of security resources necessary to implement the security assurance level security requirement include the at least one specific tooling requirement specified by the second user in the security policy;
wherein the providing and enforcing steps are carried out in software executing in a hardware element.

2. The method as described in claim 1 wherein the input approves a pending security configuration change.

3. The method as described in claim 1 wherein the input overrides a selection by a first user of the template, or a security capability associated with the template.

4. The method as described in claim 1 wherein the input inhibits deployment of an application into the cloud application environment when a template having a minimum security assurance level associated therewith has not been selected by a first user.

5. The method as described in claim 1 wherein the security administrative view also provides one of more additional administrative functions that are one of: configuring a new template or modifying an existing template, using security analytics to manage application deployment based on enterprise security policy, defining security requirements for the cloud application environment, and auditing security capabilities available in the cloud application environment.

6. The method as described in claim 1 wherein the input initiates a security scan of the cloud application environment, and the method further includes presenting to the second user results from the security scan, the results presented to the second user including a security capability gap analysis.

7. The method as described in claim 1 wherein the input retroactively applies an upgraded template to an existing application that has been deployed in the cloud application environment.

8. The method as described in claim 1 wherein the security policy is one of: a security policy that is applied system-wide, and a security policy that is scoped to a particular domain.

* * * * *